United States Patent [19]
Mullins

[11] 3,773,097
[45] Nov. 20, 1973

[54] DEVICE FOR REPAIRING TIRE PUNCTURES

[75] Inventor: Gene M. Mullins, Monrovia, Calif.

[73] Assignee: Edgar F. Whitmore, San Marino, Calif.

[22] Filed: Apr. 21, 1971

[21] Appl. No.: 136,270

Related U.S. Application Data

[63] Continuation of Ser. No. 805,179, March 7, 1969, abandoned, which is a continuation-in-part of Ser. No. 713,454, March 15, 1968, abandoned.

[52] U.S. Cl. ............................................. 152/370
[51] Int. Cl. ............................................. B60c 21/06
[58] Field of Search ........................... 152/369, 370

[56] References Cited
UNITED STATES PATENTS

| | | | |
|---|---|---|---|
| 3,342,240 | 9/1967 | Williams | 152/370 |
| 3,400,445 | 9/1968 | Crandall et al. | 152/370 |
| 3,382,907 | 5/1968 | Hough | 152/361 |
| 2,974,715 | 3/1961 | Soares et al. | 154/14 |
| 3,296,048 | 1/1967 | Wolfe | 156/97 |
| 2,966,189 | 12/1960 | Chambers et al. | 152/370 |
| 3,088,512 | 5/1963 | Buckland | 152/370 |
| 3,267,982 | 8/1966 | Garrison | 152/370 |

FOREIGN PATENTS OR APPLICATIONS

| | | | |
|---|---|---|---|
| 160,359 | 3/1920 | Great Britain | 152/370 |

*Primary Examiner*—Gerald M. Forlenza
*Assistant Examiner*—Robert Saifer
*Attorney*—Christie, Parker & Hale

[57] ABSTRACT

A repair device for sealing a puncture hole in a tire includes a plug made of rubber which is shaped to make a snug fit into the hole. When heated, the plug fuses to the tire casing.

3 Claims, 8 Drawing Figures

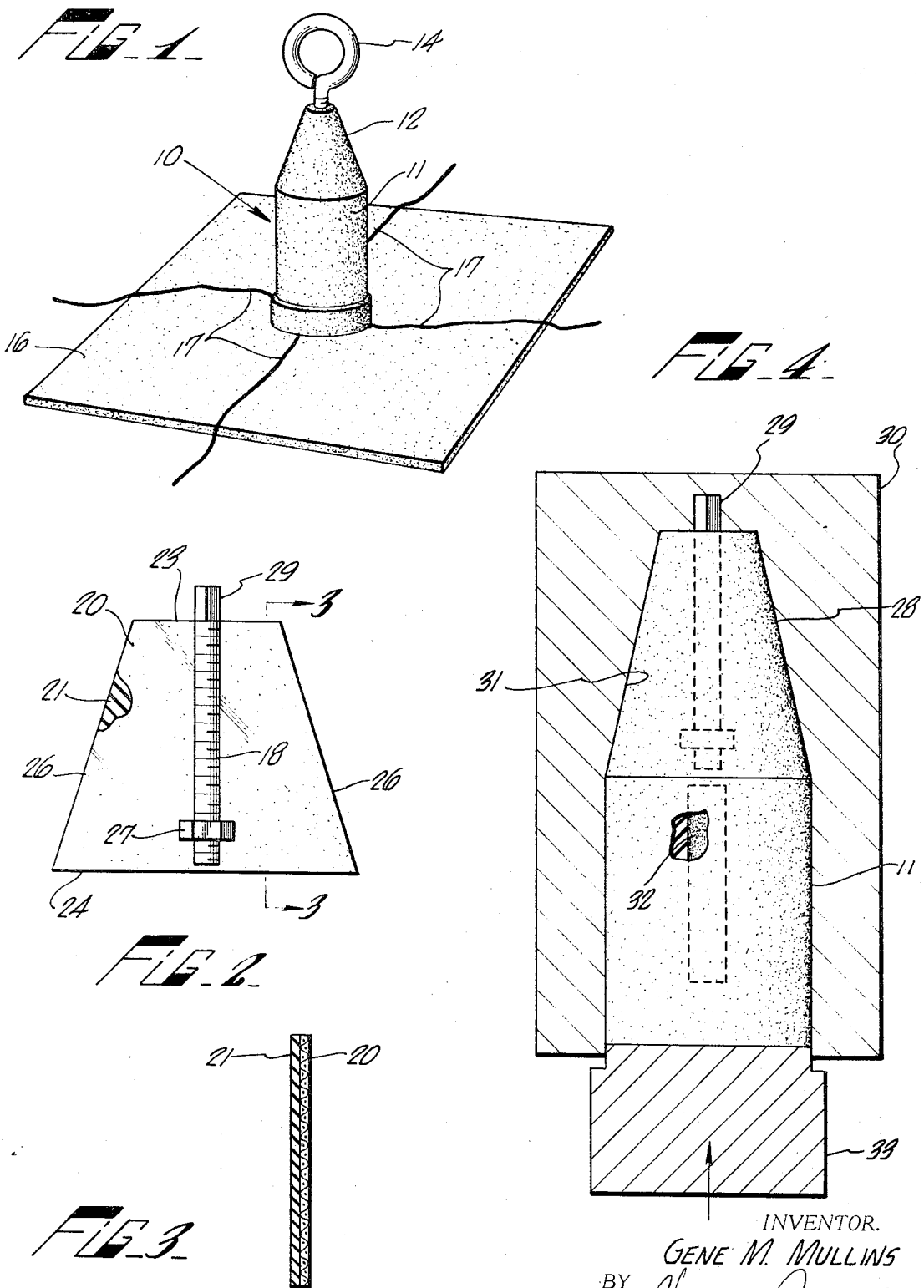

Patented Nov. 20, 1973

DEVICE FOR REPAIRING TIRE PUNCTURES

REFERENCE TO RELATED APPLICATION

This application is a continuation of application Ser. No. 805,179, filed Mar. 7, 1969, now abandoned which is a continuation-in-part of application Ser. No. 713,454, filed Mar. 15, 1968 and now abandoned.

BACKGROUND OF THE INVENTION

This invention relates to a device for sealing holes in resilient-walled objects designed to hold fluids or gases, especially when under pressure. More particularly, such device is used to repair puncture holes in vehicle tires having relatively thick, resilient walls such as truck, tractor, and bus tires.

A widely employed method for repairing punctures in truck tires, referred to as "sectioning," involves beveling the puncture hole down to the casing, positioning uncured rubber strips (sections) within the enlarged hole, and subjecting the rubber strips to heat and pressure. An uncured rubber boot is also usually placed in the casing over the puncture area, so that the cured strips and boot seal the hole. Although this method results in an adherent seal, the time and skill required to properly place the rubber strips in the puncture hole make it an expensive, and often impractical repair process. Moreover, air is often trapped between the rubber layers, which occasions frequent tire failure. The sectioning process also results in a weighty seal, due to the enlargement of the hole and introduction therein of a significant number of the strips. The rubber strips are usually softer than the original tread rubber, thus providing inferior wearing ability.

In an attempt to avoid the time and expense involved in the sectioning repair method, cold patch techniques, i.e., those which do not require heat and pressure, have been employed. One such technique utilizes a rubber plug attached to a boot for combined inside and outside repair of a puncture, comparable to the use of the rubber strips and boot in the sectioning process. Special and often costly chemically bonding cement is used to bond the plug and boot to the tire. Despite a shorter time period for application gained by use of this technique, careful installation must still be made to obtain an adherent seal.

For example, in the process of enlarging the puncture hole for insertion of the plug, drilling usually must be done from the inside of the casing to obtain the required close seating of the plug at its base. This awkward step must also be accomplished without in any way burning or otherwise damaging the sides of the hole or disturbing the cords therein so that a hole is formed which will closely mate with the plug. It is usually further required that a hole be drilled in the casing and enlarged to taper to a larger diameter from the inside to the outside of the tire. Even with a close fit, the chemically bonded plug is not as adherent or durable as the section repair. Moreover, the plug usually protrudes, often by as much as one-half inch, above the tread and thus does not move in unison therewith. Thus, such cold patch is at best a stopgap repair device, used when not enough time is available for sectioning or when a worn tire is not worth the expense of section repair.

STATEMENT OF THE INVENTION

The tire repair device of this invention includes a plug for insertion into the puncture hole from inside the tire. The plug makes a snug fit in the hole and is made of rubber which is deformable, and curable to a resilient state wherein the plug fuses with and becomes an integral part of the tire. Preferably, the plug is formed of uncured or partially cured rubber, usually natural rubber, although synthetic rubber of a deformable cured rubber plug can be used as long as it has the property of being fusable to the tire. If the plug is made of substantially fully cured rubber, then a sheet of raw (uncured) or partially cured rubber is disposed around the more fully cured plug. When the plug is placed in the tire hole and heated, the sheet softens, fuses the plug to the tire, and cures to make a strong bond between the plug and tire.

Raw (or uncured) rubber softens when heated, stiffens when cooled, and has low tensile strength and other unsatisfactory physical properties. It is improved by vulcanization, i.e., heating in the presence of sulfur. Vulcanization is a progressive reaction. It is preferably carried to a point which produces a "cured" rubber with optimum properties. Rubber which has not been heated long enough is "under cured," while rubber which has been heated too long becomes charred, and is "over cured."

Substantially raw or uncured rubber is herein defined as any solid rubber composition, whether natural or synthetic, which is sufficiently similar to raw rubber that it can be readily deformed and fused to the tire casing such that a firm, continuous bond is formed thereto.

Partially cured rubber is herein defined as any solid rubber composition, natural or synthetic, which is cured to a state wherein it has sufficient strength and resilience to be forced into a puncture hole without significantly being permanently deformed, and yet which can at least slightly soften and deform during curing to adapt to the contour of the puncture hole and fuse with the casing.

Curable rubber is used herein to mean either raw or partially cured rubber which will soften and fuse on heating.

Cured rubber is herein defined as that rubber which is vulcanized or treated with heat or chemicals such that it does not melt with further heating.

A preferred tire repair device of this invention includes a pulling member embedded in the plug. The pulling member has a higher tensile strength than the plug, and facilitates pulling the plug into the puncture hole in the tire. Preferably, a boot of curable rubber is attached to one end of the plug, and a shoulder of curable rubber is disposed around the plug adjacent the boot member. The shoulder flows readily during curing and forms a head or flange on the inside of the tire and larger than the puncture to seal and lock the plug in place. Alternatively, the boot can be a separate piece that is bonded to the plug when the plug is sealed in the tire.

The repair device is installed by enlarging the puncture hole to remove substantially all of the severed or ruptured parts of the tire, cleaning the casing surface in the area of the puncture hole, inserting the pulling member into the hole from the inside of the tire to seat the plug in the hole, and applying heat and pressure to the tire to provide a resilient, adherent seal of the puncture. Cementing and lubricating fluid are usually applied to the hole and puncture area of the casing to permit ready insertion of the plug member and to obtain partial sealing of the boot member to the casing prior to the curing step. The strong pulling member makes it possible to pull the plug with great force into a tight hole. This insures a strong bond between the plug and tire after fusing under heat and pressure.

An important advantage results from the uncured rubber shoulder at the base of the attached end of the plug because the shoulder flows readily during curing. After insertion of the plug in the puncture hole, and application of heat and pressure, the shoulder material rapidly liquefies, allowing the adjacent portion of the plug to deform outwardly, thereby providing a rivet-type head on the casing side of the puncture hole and driving the ready-flowing shoulder material fluid in its path. When the plug is attached to a boot, the shoulder composition fills and seals the space between the casing and boot resulting from protrusion of the plug. When an uncured natural rubber boot is employed with a semi-cured plug and uncured natural rubber shoulder, the cured assembly is characterized by a continuous, adherent and durable, integral seal which responds in unison with the tire tread to forces exerted on the tire.

Although the utilization of a shoulder at the base of the plug is an especially preferred embodiment of this invention, the device without such shoulder feature can also be employed as noted above. The simpler device is ordinarily employed only to repair small diameter punctures, i.e., those below about ⅞ of an inch, the preferred form being almost exclusively used with larger diameter punctures.

The repair device is characterized by an ease of application comparable to that gained using the cold patch technique, yet affords a more durable seal. That is, relatively little skill or time is required for installing the repair device of this invention, in contrast with the much more demanding hand technique required by the sectioning process. Instead of carefully preparing a beveled opening and positioning therein a number of layers of rubber strips, the worker need only drill a hole, insert the plug, and cure in a heat and pressure mold.

Curing of the repair device within the puncture hole can be accomplished using conventional section or retread molding equipment, usually including a mandrel or air bag, female mold, and heating element. Because of the significantly lesser amount of sealing materials used, however, and due to the use of a semi-cured plug, the time required for the molding operation is considerably less than that required for sectioning. Curing of the plug, shoulder and boot, when an uncured rubber boot is employed, can often be accomplished in one-third the time, or less, normally required in sectioning.

In addition to allowing a shorter molding period, the repair device of this invention requires less time for installation prior to curing of the parts. That is, painstaking preparation of the puncture hole, as noted above, is not necessary. After determining the direction of the puncture by probing with a metal rod, the puncture hole is quickly drilled from the outside surface of the tire. Thus, besides requiring less skill for installation, the overall time required is considerably less than that necessitated by sectioning. Consequently, the repair device can be applied at a much lower cost.

The repair device also provides a more durable puncture seal than the section because of the minimal hole enlargement required using such device. That is, a puncture hole need by drilled only to such diameter to include the puncture, and not further. The section technique requires a bevel-cutting procedure which removes significantly more of the tire tread, often requiring regrooving of the tire tread, which is almost never called for when employing the subject repair device. Obviously, the more original undamaged tread which remains, the stronger the repair. Additionally, as mentioned above, the use of a smaller quantity of repair device materials results in a lighter weight seal and thus a less costly and less troublesome seal.

Installation of the device before curing is also simpler than that characteristic of the cold patch process where concern is necessary to effect a close fit of the plug in the puncture hole. This requirement usually calls for drilling from within the casing, an awkward procedure which often leads to inaccurate drilling, i.e., the puncture path is missed by the drill. Using the repair device of this invention, considerations of this type are not necessary, since there need only be formed a puncture hole for the simple role of accepting the plug, the bonding of the elements being accomplished by application of heat and pressure. Although the subject repair device normally requires a longer overall time for installation than does the cold patch method, the final repair occasioned by use of such novel device is much more durable, therefore providing a far superior tire repair.

In addition to repairing tread punctures, the repair device can also be applied to punctures on the shoulder, side walls, and near the bead of tires, whereas cold patch devices have generally been restricted to punctures in or near the tire tread. Even punctures which angle through the tire tread can be repaired using the subject repair device because of the unique combination of components utilized.

Since the tire repair device of this invention can be easily installed in minimum time to provide a more durable, lightweight and low-cost seal of tire punctures, it is especially advantageous for repairing truck tires or similar large and costly tires which are more economical to repair and often recap than to replace with new tires. "Off-the-road" tractor or equipment tires are also well suited for such repair. Repair of any punctured resilient walls, however, can also take advantage of the properties of the invention.

DESCRIPTION OF THE DRAWINGS

FIG. 1 is a perspective view of the tire repair device of this invention.

FIGS. 2, 3 and 4 show the steps in making the tire repair device.

DESCRIPTION OF PREFERRED EMBODIMENT

Figure 5:
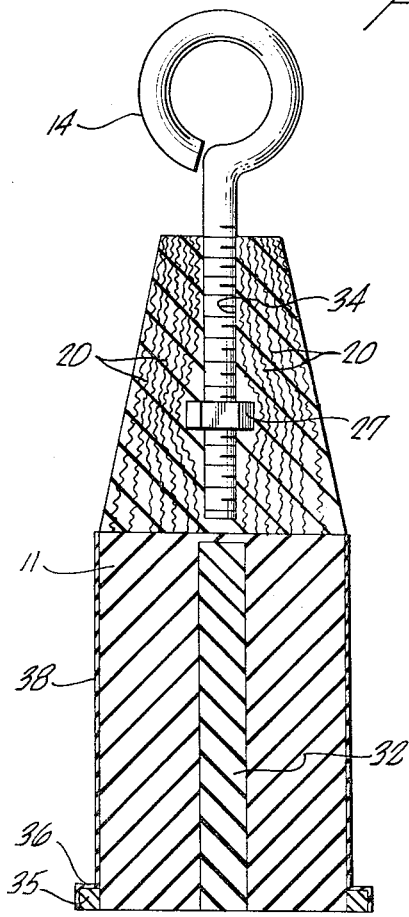
FIG. 5 is a sectional elevation of the presently preferred embodiment.

Referring to FIG. 1, a semicured rubber plug 10 includes an elongated cylindrical body 11 with a nose 12 in the form of a truncated cone bonded at its larger end to one end of the body 11. An eyebolt 14 is embedded in the cone as described more fully below. An uncured rubber boot 16 in the form of a flat sheet is secured to the end of the plug opposite the cone. Four radially extending cords or strings 17 are bonded between the boot and plug to extend outwardly over the surface of the boot and provide escape paths for air during the curing operation described below.

Referring to FIGS. 2, 3 and 4, the tire repair device of FIG. 1 is made by wrapping a threaded pilot bolt 18 in a trapezoidal sheet 20 of fibreglass matting in an identically shaped sheet 21 of raw rubber. The sheets 20 and 21 each have parallel edges 23 and 24 at their respective tops and bottoms, and upwardly and inwardly sloping sides 26 so that when the pilot bolt and a nut 27 threaded on the pilot bolt adjacent its lower end are wrapped in the two sheets, a spiralled cone 28 of fibreglass matting and raw rubber is formed around the bolt and nut. The larger end of the spiralled cone is bonded with rubber cement to one end of the cylindrical body 11. The upper end 29 of the pilot bolt extends from the narrow end of the cone and is square in cross section. The cone, cylinder, bolt and nut are placed in a mold 30 which has a cavity 31 shaped to receive the end of the bolt projecting from the smaller end of the spiralled cone, the cone itself and the cylinder 11. Preferably the cylinder is of uncured or semi-cured rubber, which can be either extruded or rolled rubber sheet. An elongated core 32 of rubber harder than that of the cylinder lies on the longitudinal axis of the cylinder. Preferably the core is square or diamond shaped in cross section and is the same length as the cylinder, with one end of the core adjacent the base of the cone and the other end just inside the cylinder. As shown best in FIG. 5, the wall thickness of the annular body 11 is substantially greater than the corresponding transverse dimension of the core.

Pressure is applied to the material in the mold by a piston 33, and the mold is heated to between 200° F and 300° F. The raw rubber and partially cured rubber softens and becomes fluid so that it completely fills the mold. A portion of the rubber in the spiralled cone flows over the exposed end of the pilot bolt and coats it. The sheet of raw rubber in the spiralled cone fuses together and permeates the fibreglass matting so that the two materials form an integral reinforcing structure around the pilot bolt and nut. The cone is also integrally fused with the cylinder. The rubber in the cylindrical part of the plug can either be completely cured or only partially cured. In either case, a substantially monolithic structure is formed.

The mold is cooled and the plug is removed from it. The rubber around the exposed end of the pilot bolt is cut away and the exposed end is rotated to back it out of the nut and a threaded bore 34 formed by the presence of the pilot bolt in the cone.

Whether the cylinder 11 is completely or only partially cured, it is preferable to bond a strip 35 of raw or partially cured rubber around the end of the cylinder 11 opposite the cone to form an annular shoulder 36. The strip 35 is secured to the cylinder 11 by dipping the cylinder in a liquid rubber cement, which is a solution of liquid rubber or raw rubber dissolved in a solvent, to make the cylinder tacky. Thereafter, the strip 35 is wrapped around the cylinder and bonded to it by the liquid rubber cement. It is also preferred to cement a sleeve 38 of raw rubber around the cylinder and strip to facilitate bonding the plug to the tire under repair as described below. If desired, the boot 16 (FIG. 1) can be added at this time or the plug can be used without the boot. The strip 35 can be applied first as shown in FIG. 5 or it can be applied after sleeve 38.

Figure 6:
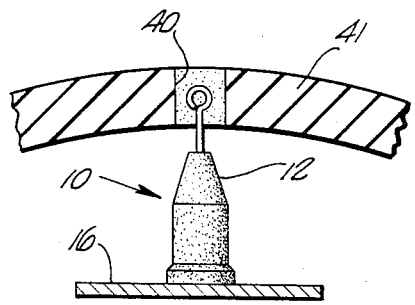
FIG. 6 is a view of the tire repair device in position to be installed in a puncture hole in a tire.
Figure 7:
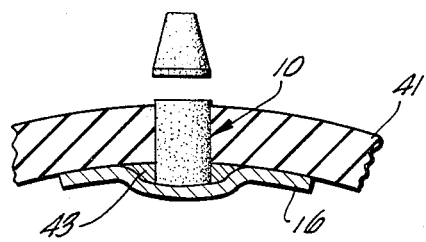
FIG. 7 is a sectional view of the tire repair device of FIG. 6 after insertion of the plug and prior to curing.
Figure 8:
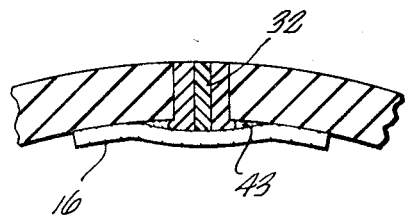
FIG. 8 is a sectional view showing the tire repair device after curing with heat and pressure.

Referring to FIGS. 6–8, when the plug is ready to be used to repair a hole 40 in a tire 41, eyebolt 14 is threaded into the bore 34 and nut 27, and the tapered end of the plug is placed in the hole from the inside of the tire so that the eyebolt projects through the hole. A suitable lever (not shown) or other device is passed through the eyebolt so that the plug can be pulled with a substantially larger force than would be possible if the eyebolt were not present. The nut and fibreglass embedded in the cone around the bolt shank provide a strong and large area of contact with the cylindrical portion of the plug so it can be deformed and firmly forced to make a snug fit in the hole.

The outer coating or sleeve of uncured rubber prevents the strip which forms the shoulder from being peeled off during storage or installation.

The plug and boot are now in the position shown in FIG. 7, i.e., shoulder 36 bears against the inside surface of the tire.

At this precuring stage, it is especially preferred that a cement or adhesive composition be employed between the casing and boot to penetrate the fabric and rubber of the tire and hold the boot in the illustrated seating position. Any conventional rubber adhesive or cement composition is usable. Thus, a layer of such adhesive composition is preferably applied to the casing before insertion of the repair device into the puncture hole, and the boot is then "stitched," or rolled into adhesive contact therewith, using conventional stitching tools.

The eyebolt is unscrewed and removed from the plug, which is then cut as shown in FIG. 7, to leave a small portion of the cylinder projecting beyond the outside surface of the tire.

Heat and pressure are applied by conventional tire mold to cause the sleeve and shoulder to melt, cure, and fuse the plug and casing together. The shoulder spreads to the position as shown in FIG. 8 to form an outwardly extending flange or rivet head 43 which fills the space between the boot and tire and creates an integral bond between them. If the rubber in the plug cylinder is not already completely cured, the curing is finished during the molding operation.

During the molding operation in the tire mold, the strings (shown only in FIG. 1) provide escape paths for air and gas and thereby prevent the formation of trapped bubbles which would weaken the repair job.

As shown by FIG. 7, seating occurs when the casing rests upon the shoulder, which has a smooth or beveled outer edge. This particular design most readily allows the shoulder material to flow during curing, outwardly from the plug so that the plug can be formed in the desired manner. Other shoulder designs, such as those utilizing angular edges or noncontinuous edges or sides, can also be employed as long as they permit the described deformation of the plug. The preferred smooth-type shoulder, however, accomplishes this purpose without requiring careful attenuation to seating of the plug.

Referring to FIG. 8, the plug has been deformed under heat and pressure to provide a rivet-type head which, together with bonding of the tread rubber with the rubber plug, forms an adherent and durable seal of the puncture hole. The shoulder and sleeve (FIG. 5) have been completely liquefied, the uncured rubber being forced away from the plug during its deformation and being cured as a layer where it aids in further securing the repair device. Any molding equipment or suitable apparatus can be employed to cure the repair device under pressure. Using conventional pressures and temperatures, the time required is usually about one-third of that required for a corresponding section repair. After curing, outer plug protrusions, if present, are buffed or otherwise removed, exposing the core of harder rubber in the center of the plug. The tire is now ready for use.

The annular body of rubber in the cylindrical portion of the plug has a Durometer hardness of between about 30 and about 40, and the harder rubber of the core has a Durometer hardness between about 50 and about 60. Thus, the core is of harder and tougher rubber so it resists wear better than the surrounding portion of the plug. This facilitates longer wear of the plug and prevents "dishing" or concave wearing of the plug during the subsequent use of the tire.

Often, the repair devices of this invention are utilized on tires to be recapped but such repair devices are equally valuable simply for repairing tires which are to be directly reused, without being recapped.

The boot employed in the repair device of this invention as noted above preferably is attached to the plug before installation, although it could be attached during or subsequent to curing and deformation of the plug. The boot material also preferably comprises uncured natural rubber, although semicured and even cured rubber boots can be employed in repair devices constructed with the shoulder member. When a device without such shoulder is utilized, however, it is essential that the boot composition be substantially uncured, as discussed above. Additionally, the boot usually consists of a number of overlapping layers of uncured rubber having cords disposed therein for further increasing the strength of the repair. Ordinarily the boot is of a rectangular or oval shape having a thickness of up to about ½ inch, the plug being attached at its center.

Preferably the shoulder material comprises an uncured natural rubber composition characterized by fast flowing properties during curing, although any compositions having similar properties, such as like-behaving natural or synthetic rubber compositions, can also be employed. The dimension of the shoulder material depends mainly upon the size of the plug used and thus varies with the size of the puncture hole. Generally, the shoulder has a height of up to about ½ inch and a thickness of up to about ½ inch.

The plug material preferably is a semicured natural rubber or a similar curable and deformable material which can be used as a sealing device in accordance with this invention. It is desirable that the plug be at least partially uncured because it can be finally cured to provide the adherency characteristic of the disclosed repair device. If the plug is fully cured before use, the raw rubber sleeve effects a strong bond.

The preferred natural rubber for use in making the shoulder material and the boot comprises cis-1,4-polyisoprene, a stereo-specific polymer produced by natural growth processes in rubber trees and plants. Modifications of this polymer as well as synthetic rubbers, such as styrene-butadiene rubber, acrylonitrile rubber, and the like, and synthetic natural rubbers, such as cispolybutadiene and cis-polyisoprene, are also suitable when formulated or modified such as to function as described.

In carrying out the process of this invention, a hole is first drilled around the tire rupture or puncture, the direction of the puncture being determined by insertion of a rod therein. A hollow drill bit is then used for the drilling. A small diameter bit is first used, followed by a larger one, until a smooth ring of tire is removed, the smooth ring indicating that no broken or ruptured cords lie outside of the hole. The inside of the tire casing in the area of the puncture is then buffed or otherwise cleaned to remove dirt and moisture. The puncture area is usually roughened to insure adhesion. A cement coating, which may consist of any conventional vulcanizing composition, is then ordinarily applied to the buffed area and dried over about a 30 minute period. The unattached end of the plug is then inserted into the hole, grasped from the outside of the tire and pulled into seating position. The protruding portion of the plug is cut off above the tread level, preferably about one-quarter to ½ inch above the tread level, and the tire is placed in a mold for curing. As noted above, conventional section molding equipment or any suitable apparatus can be so employed. After a curing stage of about one hour, the tire can be removed.

The described tire repair device can be used with tires having tubes, as well as with tubeless tires, to seal puncture holes of diameters up to about four inches and greater. It is noted, however, that this invention can be used to repair holes in any wall of relatively resistant material, and reference to a tire repair device is not to be considered limiting to tire repair applications.

I claim:

1. A device for repairing a hole in a tire, the device comprising a rubber plug of a size and shape to make a snug fit within the hole, a nut embedded in the plug, an elongated bolt threaded into the nut and embedded in the plug, the bolt extending from the plug to facilitate pulling the plug into the hole, and a reinforcing material embedded in the plug and surrounding the bolt and the nut, the bolt having a higher tensile strength than the plug.

2. A repair device according to claim 1 in which the bolt is an eyebolt with the eye portion of the bolt projecting from the plug.

3. A device for repairing a hole in a tire, the device comprising an elongated rubber plug of a size and shape to make a snug fit within the hole, the plug including an elongated core of cured rubber, an annular body of cured rubber having a hardness less than that of the core, the core and annular body being fused together to form a substantially monolithic plug, the annular body having a wall thickness greater than the corresponding transverse dimension of the core, an external annular shoulder of curable rubber secured around and adjacent one end of the plug, a boot of curable rubber bonded to the end of the plug and adjacent the shoulder of cured rubber, and string bonded between the boot and the plug, the string extending from the portion of the boot bonded to the plug to the periphery of the boot to provide an escape for air when the boot and annular shoulder are heated to bond them and the plug to the tire.

* * * * *